United States Patent
Coudert et al.

(10) Patent No.: US 10,822,961 B2
(45) Date of Patent: Nov. 3, 2020

(54) TURBINE BLADE COMPRISING AN IMPROVED TRAILING-EDGE

(71) Applicant: SAFRAN AIRCRAFT ENGINES, Paris (FR)

(72) Inventors: Laurent Patrick Robert Coudert, Nandy (FR); Erwan Daniel Botrel, Alfortville (FR)

(73) Assignee: SAFRAN AIRCRAFT ENGINES, Paris (FR)

(*) Notice: Subject to any disclaimer, the term of this patent is extended or adjusted under 35 U.S.C. 154(b) by 25 days.

(21) Appl. No.: 15/740,451

(22) PCT Filed: Jul. 1, 2016

(86) PCT No.: PCT/FR2016/051666
§ 371 (c)(1),
(2) Date: Dec. 28, 2017

(87) PCT Pub. No.: WO2017/001801
PCT Pub. Date: Jan. 5, 2017

(65) Prior Publication Data
US 2018/0187553 A1   Jul. 5, 2018

(30) Foreign Application Priority Data
Jul. 2, 2015   (FR) .................................. 15 56276

(51) Int. Cl.
*F01D 5/18*   (2006.01)

(52) U.S. Cl.
CPC .............. *F01D 5/187* (2013.01); *F01D 5/18* (2013.01); *F05D 2220/323* (2013.01);
(Continued)

(58) Field of Classification Search
None
See application file for complete search history.

(56) References Cited

U.S. PATENT DOCUMENTS 6,190,129 B1    2/2001  Mayer et al.
8,092,175 B2 *  1/2012  Beeck .................. F02C 3/16
                                                 416/95
(Continued)

FOREIGN PATENT DOCUMENTS

EP        2 320 029 A1    5/2011

OTHER PUBLICATIONS

International Search Report dated Sep. 23, 2016, in PCT/FR2016/051666 filed Jul. 1, 2016.
(Continued)

*Primary Examiner* — Igor Kershteyn
*Assistant Examiner* — Juan G Flores
(74) *Attorney, Agent, or Firm* — Oblon, McClelland, Maier & Neustadt, L.L.P.

(57) ABSTRACT

A turbomachine blade including a hollow body defining a cavity, and including a downstream trailing edge. The blade further includes at least one hole which communicates with the cavity and which opens downstream onto the trailing edge. The trailing edge extends along the main radial direction of the blade, and including a downstream convex face. The blade is characterised in that each hole opens onto a planar rear face of a flat region formed in the trailing edge.

9 Claims, 2 Drawing Sheets

(52) U.S. Cl.
CPC .. *F05D 2240/122* (2013.01); *F05D 2240/304* (2013.01); *F05D 2260/20* (2013.01); *Y02T 50/673* (2013.01); *Y02T 50/676* (2013.01)

(56) References Cited

U.S. PATENT DOCUMENTS

| | | | |
|---|---|---|---|
| 8,671,696 B2* | 3/2014 | Andersen | F02C 3/305 |
| | | | 415/115 |
| 8,770,920 B2* | 7/2014 | Naik | F01D 5/187 |
| | | | 415/115 |
| 9,719,357 B2* | 8/2017 | Moody | F01D 5/186 |
| 2007/0031252 A1 | 2/2007 | Walters et al. | |

OTHER PUBLICATIONS

Preliminary French Search Report dated Apr. 26, 2016, in FR 1556276 filed Jul. 2, 2015.

* cited by examiner

TURBINE BLADE COMPRISING AN IMPROVED TRAILING-EDGE

TECHNICAL FIELD

The invention relates to a turbomachine blade, in particular a turbine blade, comprising holes formed on the trailing edge of the blade and which open onto an internal cavity of the blade.

The invention relates more particularly to a blade for which the trailing edge is configured to limit the aerodynamic losses.

PRIOR ART

Some turbomachine blades, and more particularly the mobile blades of the turbine, are subject to many thermal stresses coming from very hot gases coming from the combustion chamber.

The blades comprise for this purpose an internal ventilation circuit through which a flow of fresh air flows through the blade, in order to cool it.

The blade as such comprises one or several internal cavities and holes opening onto the trailing edge of the blade, in order to remove the fresh air.

Optimising the operation of the turbomachine imposes that the trailing edge of the blade has a radius of curvature that is as small as possible.

On the other hand, such a radius of curvature makes it difficult to carry out the holes.

On the contrary, a trailing edge that has a substantial radius of curvature facilitates the carrying out of the holes but reduces the efficiency of the turbine due to the presence of disturbances on the trailing edge.

The invention has for purpose to propose a turbomachine blade carried out to reconcile these two requirements.

DISCLOSURE OF THE INVENTION

The invention proposes a turbomachine blade comprising a hollow body defining a cavity, and comprising a downstream trailing edge, the blade further comprising at least one hole which communicates with the cavity and which opens downstream onto the trailing edge, the trailing edge extending along the main radial direction of the blade, and comprising a downstream convex face, characterised in that each hole opens onto a planar rear face of a flat region formed in the trailing edge.

This downstream face makes it possible to facilitate the operation of drilling in the trailing edge. In addition, the presence of several planar faces in the trailing edge, which are located on the holes involve only small aerodynamic losses.

Preferably, the rear face is substantially perpendicular to the main direction of the associated hole.

Preferably, the trailing edge comprises segments radially distributed on either side of each flat region, of which the downstream faces of the segments form the downstream convex face of the trailing edge.

Preferably, the rear face of each flat region is defined radially by the radial end faces of the segments.

Preferably, each radial end face of the segments is inclined with respect to a radial plane of an angle ($\alpha$) of which the value is between 45 and 90 degrees inclusive.

Preferably, each flat region is associated with a hole.

Preferably, all the flat regions have the same radial height.

Preferably, several holes open onto the rear face of the same flat region.

Preferably, the radial height of each flat region is defined according to the number of holes which open onto said flat region.

Preferably, the trailing edge comprises segments radially distributed on either side of each flat region, of which the downstream faces of the segments form the downstream convex face of the trailing edge.

The invention also relates to an aircraft turbomachine comprising a turbine rotor provided with blades such as defined hereinabove.

BRIEF DESCRIPTION OF THE DRAWINGS

Other characteristics and advantages of the invention shall appear when reading the following detailed description for the understanding of which reference will be made to the annexed figures among which.

DETAILED DESCRIPTION OF PARTICULAR EMBODIMENTS

Figure 1:
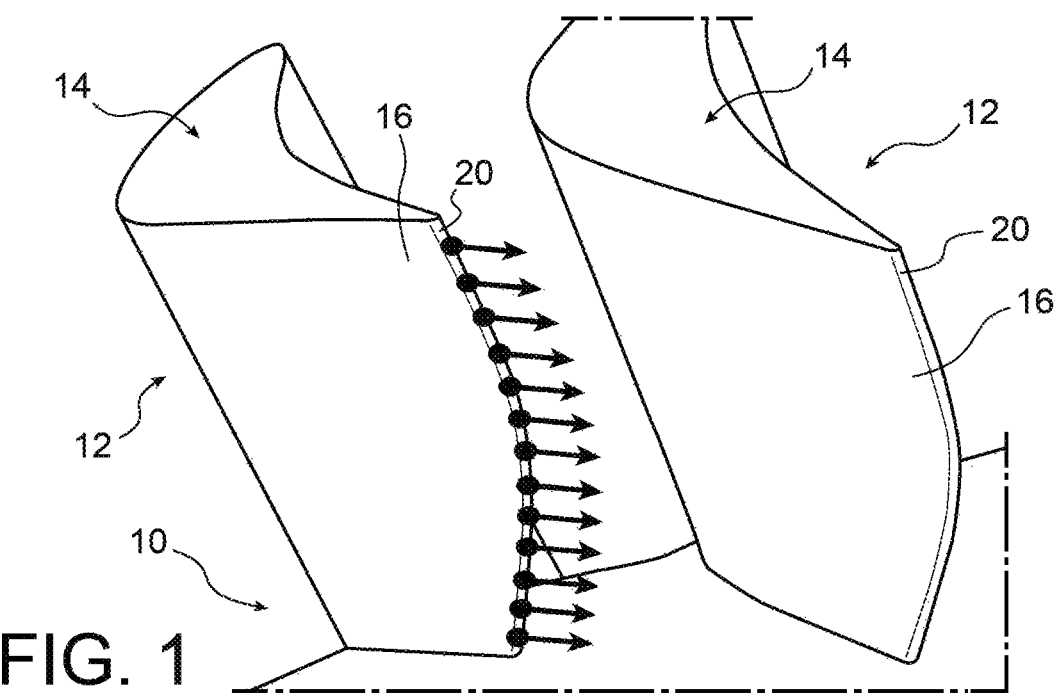
FIG. 1 diagrammatically shows a portion of an aircraft turbine comprising blades carried out according to the invention

FIG. 1 shows a portion of a turbomachine rotor 10, wherein two blades 12 are shown. As a non-limiting example, this portion is a portion of the high-pressure turbine of the turbomachine.

Each blade 12 cooperates with the hot gases coming from the combustion chamber of the turbomachine and it is consequently brought to a high temperature during the operation of the turbomachine.

In order to reduce the heating thereof, the blade 12 comprises a hollow body defining one or several cavities 14 in each one of which a flow of fresh air flows. As such, in order to cool its trailing edge 16, the blade 12 comprises a plurality of holes 18 which extend from a cavity and which open on the trailing edge 16.

Each hole 18 is made during a drilling operation, after the carrying out by moulding of the blade 12. For this, the drilling tool is put into contact with the downstream face 20 of the trailing edge 16.

The carrying out of the blade 12 by moulding, and the optimising of the flow of the hot gas flux on the trailing edge 16 have for consequence that the section of the downstream face 20 of the trailing edge 16, according to a plane perpendicular to the main radial direction of the blade, is of rounded convex shape and domed downstream. In addition, the radius of curvature of this downstream face 20 is as small as possible in order to limit the aerodynamic disturbances on the trailing edge.

As starting to drill on a rounded surface is relatively difficult, the trailing edge 16 comprise several flat regions 22, of which each flat region 22 is located on a hole 18.

Each flat region 22 comprises a rear face 24 that is substantially perpendicular to the main axis of the hole 18 associated with the flat region 22. This rear face 24 is set back in relation to the downstream face 20 of the trailing edge 16.

The rear face 24 of the flat region 22 consists of a planar surface that facilitates the drilling operation since the tool has less risk of deviating with respect to the desired position of the hole 18.

Each flat region 22 is located radially between two segments 26 of the trailing edge 16 of which the downstream face of these segments 26 forms the downstream face 20 of the trailing edge.

Figure 3:
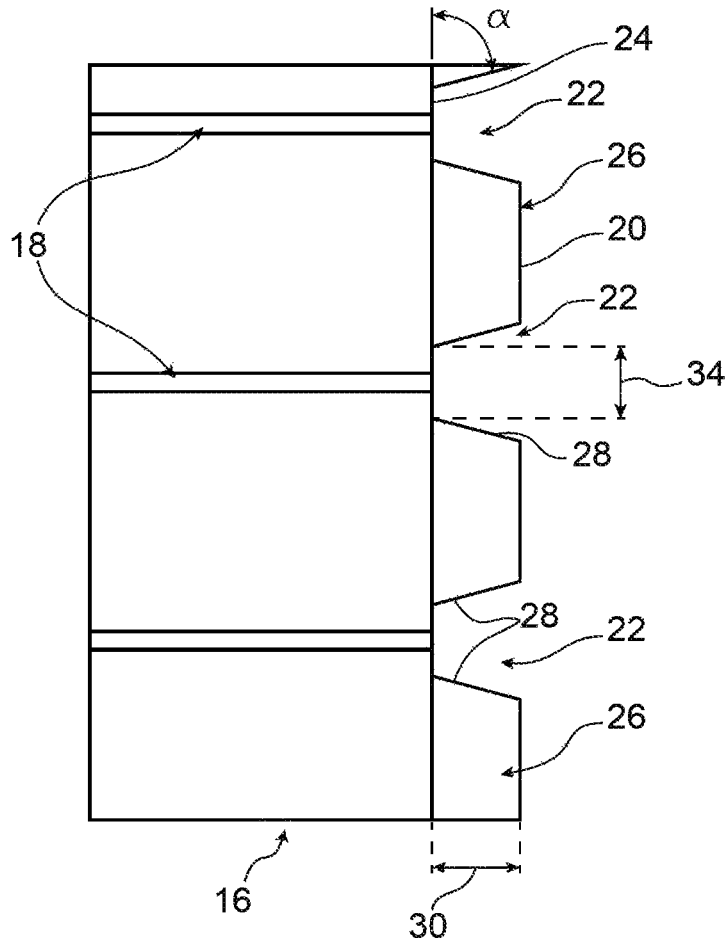
FIG. 3 is a section of a blade shown in FIG. 1 according to a main radial plane of the blade

The segments 26 comprise radial end faces 28, which radially define the flat regions 22 and therefore the rear face 24 of each flat region 22. According to the embodiment shown in FIG. 3, the radial end faces 28 of the segments 26 are inclined in relation to the perpendicular to the associated flat region 22. A flat region 22 which is defined by two of these faces 28 is therefore in the form of a chamfer, of which the radial width increases when moving away from the rear face 24.

It will be understood that the invention is not limited to this embodiment and that the radial end faces 28 of the segments 26 can be perpendicular to the associated flat region 22.

Generally, each radial end face 28 is inclined with respect to a radial plane passing through each flat region 22 by an angle α of which the value is between 45 and 90 degrees inclusive.

According to the embodiment shown in the figures, each flat region 22 is associated with a single hole 18. However, it will be understood that the invention is not limited to this embodiment and that a flat region 22 can be associated with several holes 18, i.e. several holes can open onto the rear face 22 of the same flat region 22.

This alternative embodiment is advantageous when the various holes 18 which open onto the same flat region 22 are located in the vicinity of one another.

Figure 4:
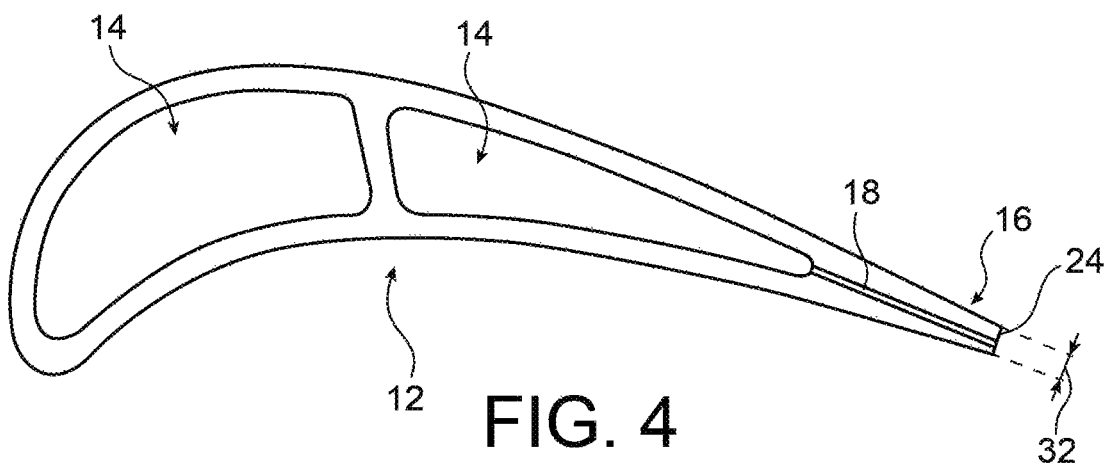
FIG. 4 is a section of the blade shown in FIG. 3, according to a plane passing through a hole of the blade.

The dimensions of each flat region 22 are defined in order to make it possible to carry out each one of the holes 18. For this, the depth 30 of the flat region 22, which is the distance between the most downstream portion from the downstream face 20 of the trailing edge 16 and the rear face 24 of the flat region, is defined according to the general dimensions of the trailing edge 16 in order to obtain a sufficient width 32 of the rear face 24 (FIG. 4).

The same applies concerning the radial height of the flat region 22 which defines the height of its rear face 24. Preferably, the radial height of each flat region 22 is defined according to the number of holes 18 which open onto said flat region 22. And the flat regions 22 of the same blade 12 can have several different radial heights.

Figure 2:
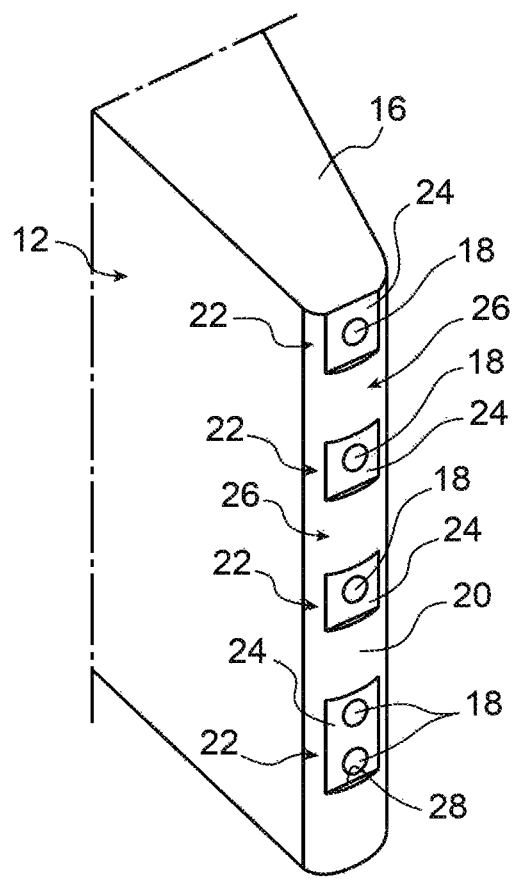
FIG. 2 is a detail in perspective of the trailing edge of a blade shown in FIG. 1

For example, according to the embodiment shown in FIG. 2, the flat region 22 located radially in the vicinity of the root of the blade 12 is associated with two holes 18, and each one of the other flat regions 22 is associated with a single hole 18. As such, the radial height of the flat region 22 located radially in the vicinity of the root of the blade 12 is greater than the radial height of the other flat regions.

The radial height of each segment 26 of the trailing edge 16 is determined according to the radial dimension de the rear face of each flat region, as well as according to the radial distance between the holes 18.

In any case, the width 32 and the height 34 of the rear face 24 of the flat region must be as small as possible so that the aerodynamic disturbances produced on the trailing edge 16 on each flat region 22 are the least substantial as possible, while still allowing for the for the carrying out of each hole.

Moreover, the aerodynamic disturbances, referred to as packed losses, which form on each rear face of a flat region 22 are reduced by the injecting of air into the flat region 22, during the cooling of the vane.

The invention claimed is:

1. A turbomachine blade comprising a hollow body defining a cavity, and comprising a downstream trailing edge,
    the blade further comprising at least one hole which communicates with the cavity and which opens downstream onto the trailing edge,
    the trailing edge extending along the main radial direction of the blade, and comprising a downstream convex face,
    wherein each hole of the at least one hole opens onto a planar rear face of a flat region formed in the trailing edge,
    wherein the trailing edge comprises segments radially distributed on either side of each flat region, of which downstream faces of the segments form the downstream convex face of the trailing edge,
    wherein each segment comprises radial end faces that are inclined with respect to a direction to each flat region, and
    wherein each radial end face of the segments is inclined with respect to a radial plane by an angle which is greater than or equal to 45 degree and less than 90 degrees.

2. The turbomachine blade as claimed in claim 1, wherein the planar rear face is substantially perpendicular to the main direction of an associated hole of the at least one hole.

3. The turbomachine blade as claimed in claim 1, wherein the planar rear face of each flat region is defined radially by the radial end faces of the segments.

4. The turbomachine blade as claimed in claim 1, wherein each flat region is associated with a hole of the at least one hole.

5. The turbomachine blade as claimed in claim 4, wherein all the flat regions have the same radial height.

6. The turbomachine blade according to claim 1, wherein several holes of the at least one hole open onto the planar rear face of the same flat region.

7. The turbomachine blade as claimed in claim 6, wherein the radial height of each flat region is defined according to the number of holes of the at least one hole which open onto said flat region.

8. An aircraft turbomachine comprising a turbine rotor provided with blades as claimed in claim 1.

9. A turbomachine blade comprising a hollow body defining a cavity, and comprising a downstream trailing edge,
    the blade further comprising at least one hole which communicates with the cavity and which opens downstream onto the trailing edge,
    the trailing edge extending along the main radial direction of the blade, and comprising a downstream convex face,
    wherein each hole of the at least one hole opens onto a planar rear face of a flat region formed in the trailing edge,
    wherein the trailing edge comprises segments radially distributed on either side of each flat region, of which downstream faces of the segments form the downstream convex face of the trailing edge,
    wherein each segment comprises radial end faces that are inclined with respect to a direction to each flat region, and wherein the planar rear face is substantially perpendicular to the main direction of an associated hole of the at least one hole.

\* \* \* \* \*